(12) United States Patent
Oku et al.

(10) Patent No.: US 7,918,489 B2
(45) Date of Patent: Apr. 5, 2011

(54) VEHICLE SEAT

(75) Inventors: Hisato Oku, Utsunomiya (JP); Jogen Yamaki, Utsunomiya (JP); Takeshi Abe, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 300 days.

(21) Appl. No.: 12/033,299

(22) Filed: Feb. 19, 2008

(65) Prior Publication Data
US 2008/0217970 A1    Sep. 11, 2008

(30) Foreign Application Priority Data
Mar. 9, 2007    (JP) .................... 2007-060507

(51) Int. Cl.
*B60N 2/68* (2006.01)
(52) U.S. Cl. .................. 296/68.1; 296/187.12
(58) Field of Classification Search ............ 296/187.03, 296/187.12, 65.13, 65.14, 65.15; 297/216.1, 297/452.18
See application file for complete search history.

(56) References Cited

U.S. PATENT DOCUMENTS

| | | | | | |
|---|---|---|---|---|---|
| 4,570,997 | A | * | 2/1986 | Tanizaki et al. | 297/344.24 |
| 4,969,687 | A | * | 11/1990 | Higuchi et al. | 297/452.18 |
| 5,110,176 | A | * | 5/1992 | Curtis | 296/187.12 |
| 5,382,083 | A | * | 1/1995 | Fecteau et al. | 297/452.2 |
| 5,468,050 | A | * | 11/1995 | Hall et al. | 297/344.1 |
| 5,501,289 | A | * | 3/1996 | Nishikawa et al. | 180/68.5 |
| 5,620,161 | A | * | 4/1997 | Wisner et al. | 248/429 |
| 6,497,455 | B1 | * | 12/2002 | Umezawa et al. | 297/452.18 |
| 6,773,050 | B1 | * | 8/2004 | Hotary et al. | 296/64 |
| 6,805,401 | B2 | * | 10/2004 | Hayashi et al. | 296/204 |
| 7,246,845 | B2 | * | 7/2007 | Rashidy et al. | 296/187.12 |
| 7,686,368 | B2 | * | 3/2010 | Ghergheli et al. | 296/65.13 |
| 2005/0046235 | A1 | * | 3/2005 | Robertson et al. | 296/193.02 |
| 2005/0161967 | A1 | * | 7/2005 | Rashidy et al. | 296/65.01 |
| 2005/0161980 | A1 | * | 7/2005 | Rashidy et al. | 296/193.02 |
| 2006/0043776 | A1 | * | 3/2006 | Rajasingham | 297/216.1 |
| 2006/0202450 | A1 | * | 9/2006 | Madasamy et al. | 280/729 |
| 2006/0283133 | A1 | * | 12/2006 | Westre et al. | 52/729.1 |
| 2006/0290160 | A1 | * | 12/2006 | Tencer et al. | 296/68.1 |
| 2007/0216203 | A1 | * | 9/2007 | Rajasingham | 297/216.11 |
| 2008/0315630 | A1 | * | 12/2008 | Klimek | 296/204 |

FOREIGN PATENT DOCUMENTS

JP    2000-103274    4/2000

* cited by examiner

*Primary Examiner* — Glenn Dayoan
*Assistant Examiner* — Pinel E Romain
(74) *Attorney, Agent, or Firm* — Rankin, Hill & Clark LLP (57) ABSTRACT

A vehicle seat includes: a seat body; a plurality of seat supports which extend along a longitudinal direction of a vehicle, are disposed with interval along a width direction of the vehicle, and support the seat body; and a load absorption member which connects the adjacent seat supports each other, wherein the load absorption member having: a plurality of beams which extend between the adjacent seat supports along the width direction of the vehicle; and a plate-shaped portion on which the beams are provided along the width direction of the vehicle and which has a plurality of areas which are partitioned with the beams so as to be arranged along the longitudinal direction of vehicle.

18 Claims, 6 Drawing Sheets

VEHICLE SEAT

BACKGROUND OF THE INVENTION

1. Field of the Invention

The present invention relates to a vehicle seat which can protect a passenger from load input from an exterior of the vehicle.

Priority is claimed on Japanese Patent Application No. 2007-060507, filed Mar. 9, 2007, the content of which is incorporated herein by reference.

2. Description of Related Art

Most front vehicle seats are provided so that a seat body is installed movably forward and backward on a pair of seat rails which are installed on a vehicle floor along the longitudinal direction of the vehicle.

In such vehicle seats, an energy absorption structure with respect to a lateral load input is not provided; therefore, the seat body cannot absorb collision energy of a lateral collision efficiently.

Therefore, vehicle seats which can absorb the energy of the side collision are contrived: for example, a vehicle seat in which left and right seat rails are connected via another frame which is extended along a width direction of the vehicle, a vehicle seat in which a pair of sliders of the seat body which are connected on left and right seat rails slidably are connected via a rib which is extended along the width direction of the vehicle (e.g., Japanese Unexamined Patent Application, First Publication No. 2000-103274). Since such vehicle seats have a structure in which the seat rails and the sliders are engaged via another frame or a rib, load input is caught at a frame and ribs, and the collision energy is absorbed by collapse thereof when a side collision load is applied to the seat body.

However, conventional vehicle seats have a basic structure such that the frame and ribs extending along the width direction of the vehicle catch a side collision load which is applied to the seat body; therefore, if the frame and ribs are deformed by the load exceeding its elastic limit, the energy absorption efficiency being rapidly deteriorated there after is a concern.

In addition, if the collision load is not applied coaxially with longitudinal directions of the frame and ribs, the frame and ribs do not collapse enough but are bent. In this case, it is also feared that the energy absorption efficiency is deteriorated.

SUMMARY OF THE INVENTION

It is an object of the present invention to provide a vehicle seat which can absorb a collision energy of a vehicle side collision irrespective of a large or small amount of the collision energy.

In order to solve the above-mentioned object, the present invention is a vehicle seat which includes: a seat body; a plurality of seat supports which extend along the longitudinal direction of a vehicle, are disposed at intervals along the width direction of a vehicle, and support the seat body; and a load absorption member which connects the adjacent seat supports each other, the load absorption member having: a plurality of beams which extend between the adjacent seat supports along the width direction of the vehicle; and a plate-shaped portion on which the beams are provided along the width direction of the vehicle to form a plurality of areas which are partitioned with the beams so that the plurality of areas are arranged along the longitudinal direction of the vehicle.

In the vehicle seat, the beams catch a load between the seat supports when there is a collision from the side and a load is applied to the one seat support along the width direction of the vehicle. At this time, if some of the beams are buckled or bent, a shearing stress is caused in the plate-shaped portion between the adjacent beams, which prevents the buckling and bending of the beams.

According to the present invention, since the shearing stress which prevents the buckling and bending of the beams owing to load input by the lateral collision is caused in the plate-shaped portion, the collision energy can be stably absorbed within a long stroke.

It is preferable that the beams of the above-mentioned vehicle seat transmit load therein to the areas of the plate-shaped portion. In this case, the collision load can be efficiently absorbed by the plate-shaped portion.

It is preferable that the seat supports of the above-mentioned vehicle seat include a pair of slide rails which support the seat body slidably forward and backward along the vehicle. In this case, a vehicle interior space can be efficiently utilized by using the slide rails as the seat supports.

The beams of the above-mentioned vehicle seat and the plate-shaped portion may be different members with each other, and the beams may be fixed on an upper face of the plate-shaped portion. In this case, rigidity of the vehicle seat can be easily improved.

It is preferable that the beams of the above-mentioned vehicle seat include: a bottom flange which is fixed on the upper face of the plate-shaped portion; and a vertical wall which stands from the bottom flange. In addition, the bottom flange and the vertical wall of the beams may form substantially an L-shaped section. In this case, the beams can be easily fixed to the plate-shaped portion.

The beams of the above-mentioned vehicle seat may include an upper flange which extends from a top of the vertical wall parallel to the bottom flange; and the bottom flange and the upper flange may extend in opposite directions from each other from the vertical wall. Otherwise, the beams may include an upper flange which extends from the top of the vertical wall parallel to the bottom flange; and the bottom flange, the upper flange, and the vertical wall therebetween may form substantially an I-shaped section. In these cases, since the upper flange is provided, the rigidity of the beams can be highly improved.

It is preferable that the bottom flange of the above-mentioned vehicle seat be joined to the plate-shaped portion substantially throughout the width direction of the vehicle. In this case, the collision load applied to the beams can be transmitted to the plate-shaped portion from the whole beams.

It is preferable that the seat supports of the above-mentioned vehicle seat be joined at bottom faces to both ends of the plate-shaped portion along the width direction of the vehicle. In this case, the collision load applied to all of the seat supports can be transmitted to the plate-shaped portion from all of the seat supports.

In the above-mentioned vehicle seat, it is preferable that the plate-shaped portion and the seat supports have substantially the same length along the longitudinal direction of the vehicle.

The beams of the above-mentioned vehicle seat may be formed as one with the plate-shaped portion by pushing upward a part of a flat plate member forming the plate-shaped portion. In this case, the vehicle seat can be easily assembled.

It is preferable that the above-mentioned vehicle seat be provided further with a middle reinforcement rib which is disposed on substantially the middle position of the plate-shaped portion along the width direction of the vehicle and extends along the longitudinal direction of the vehicle. In this case, the load can be uniformly transmitted to both ends of the middle reinforcement rib along the width direction of the vehicle with respect to the plate-shaped portion.

It is preferable that the middle reinforcement rib of the above-mentioned vehicle seat cross the beams and to be joined to the beams.

It is preferable that the load absorption member of the above-mentioned vehicle seat be further provided with a flat plate-shaped portion (i.e., an upper plate) which is joined to upper portions of the beams and the middle reinforcement rib. In this case, the deformation of the beams can be prevented more efficiently since the shearing stress is caused in the upper plate which is partitioned into a plurality of areas by the beams and the middle reinforcement rib.

It is preferable that the above-mentioned vehicle seat have a flat plate (i.e., an upper plate) which is joined to upper portions of the beams. In this case, the deformation of the beams can be efficiently prevented since the shearing stress is caused in the upper plate which is partitioned into a plurality of areas by the beams.

It is preferable that a dimple which is formed on the area of the plate-shaped portion partitioned with the beams in the above-mentioned vehicle seat so as to be depressed downward with respect to the vehicle body. In addition, the dimple may have substantially an oval-shaped extending along the width direction of the vehicle. In this case, the rigidity of the plate-shaped portion can be improved without adding another member.

DETAILED DESCRIPTION OF THE INVENTION

Embodiments of the present invention will be described with reference to the drawings. Hereinafter, the words "upper", "lower", "front", and "back" in the following description denote "upper", "lower", "front", and "back" of a vehicle body.

A first embodiment of the present invention shown in FIGS. 1 to 3 will be described.

Figure 1:
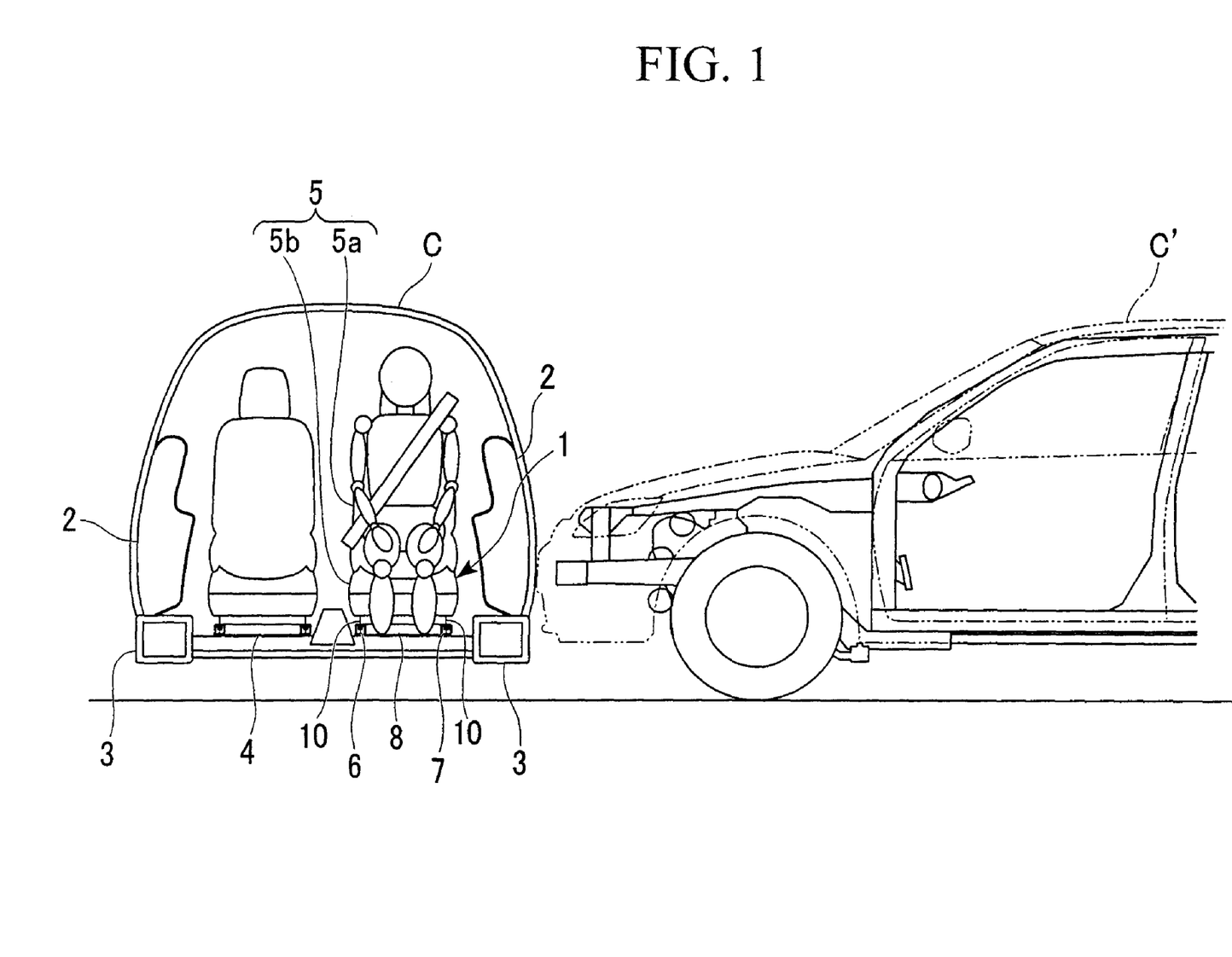
FIG. 1 is a typical explanatory view showing a first embodiment of the present invention.

FIG. 1 schematically shows a vehicle C having a vehicle seat 1 according to the present invention as a front seat and another vehicle C' colliding with the side of the vehicle C. In FIG. 1, a reference symbol 2 denotes a side door at a front seat side of the vehicle C, a reference symbol 3 denotes a side sill, and a reference symbol 4 denotes a floor panel in a compartment. The vehicle seat 1 has a seat body 5 which is disposed on the floor panel 4 at the front seat side and includes a seat back 5a and a seat cushion 5b.

Figure 2:
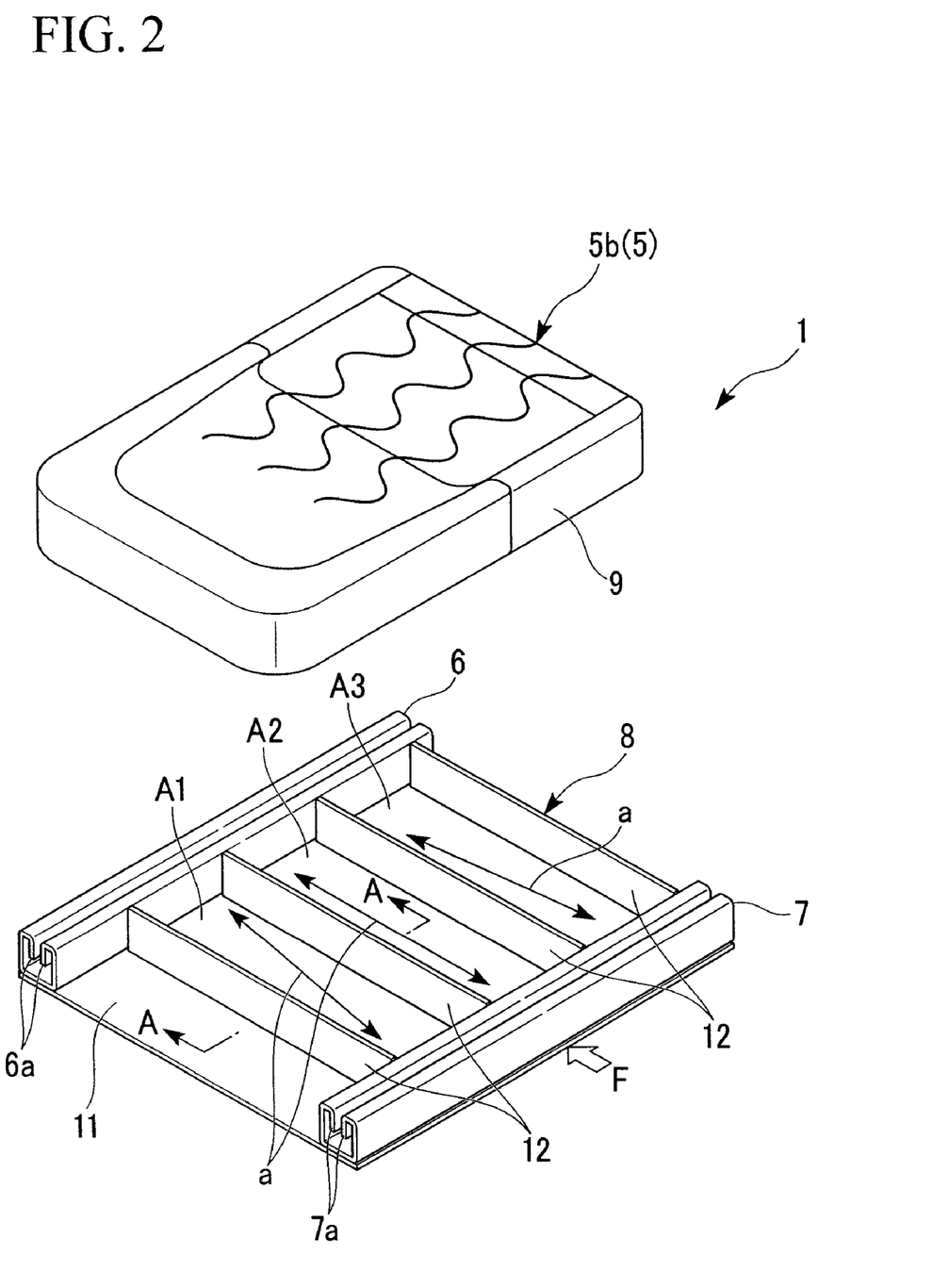
FIG. 2 is an exploded perspective view showing the first embodiment.

As shown in FIG. 2, a pair of seat rails (i.e., seat supports) 6 and 7 are fixed on the floor panel 4 along a longitudinal direction of the vehicle at intervals along the width direction of the vehicle. The pair of seat rails 6 and 7 are joined via a load absorption member 8. Each of the seat rails 7 and 8 includes a pair of side walls extending along the longitudinal direction of the vehicle, has substantially a U-shaped section which opens upward, and includes downward bends 6a and 7a which bend widthwise inward and downward from each upper end of the side walls. Sliders 10 are slidably engaged with the downward bends 6a and 7a of the seat rails 6 and 7 (refer to FIG. 1). The slider 10 projects from a lower face of a seat cushion frame 9.

The load absorption member 8 has a base plate (i.e., a plate-shaped portion) 11 having the same length along the longitudinal direction of the vehicle as the seat rails 6 and 7 and being joined to the lower face of the seat rails 6 and 7 at both ends of the width direction of the vehicle, and a plurality of ribs (i.e., beams) 12 being joined to an upper face of the base plate 11 so as to follow the width direction of the vehicle. The ribs 12 extend between side faces of the seat rails 6 and 7 at both end thereof with prescribed spaces on the base plate 11 and partition the base plate 11 into a plurality of rectangular areas A1, A2, and A3. Each of the ribs 12 is formed, as shown in FIG. 3, so as to have substantially an L-shaped section including a vertical wall 12a and a bottom flange 12b. The bottom flange 12b is joined on the upper face of the base plate 11 by welding, adhesion, and the like. Each of the bottom flanges 12b of the ribs 12 is joined to the base plate 11 substantially throughout the width direction of the vehicle.

Figure 3:
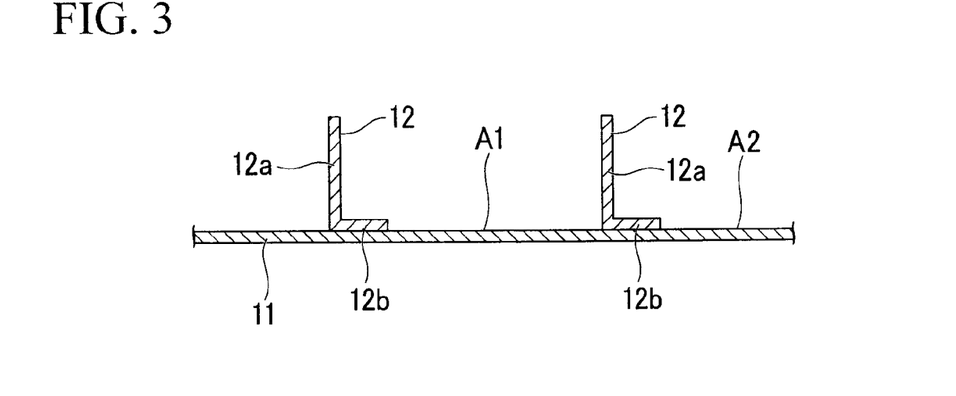
FIG. 3 is a cross-sectional view showing the first embodiment and taken along the line A-A in FIG. 2.
Figure 4:
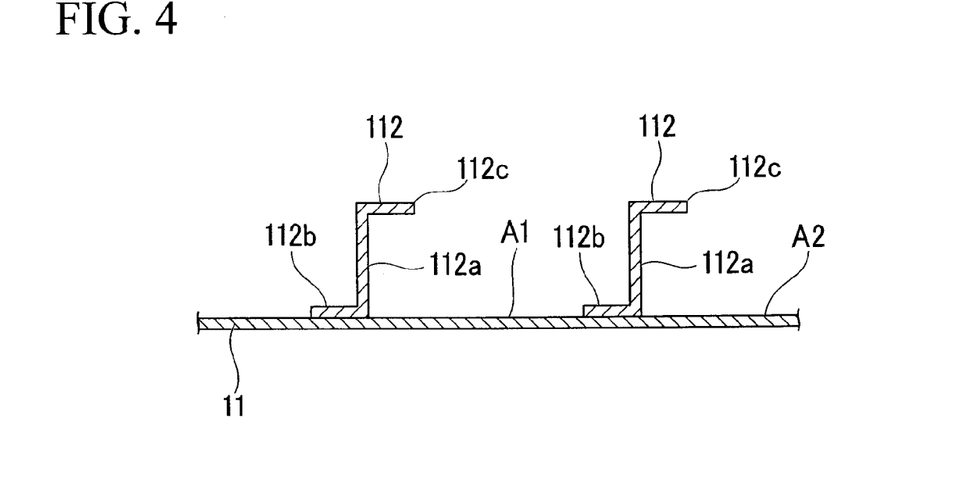
FIG. 4 is a cross-sectional view showing a modification of the first embodiment and taken along the line A-A in FIG. 2.
Figure 5:
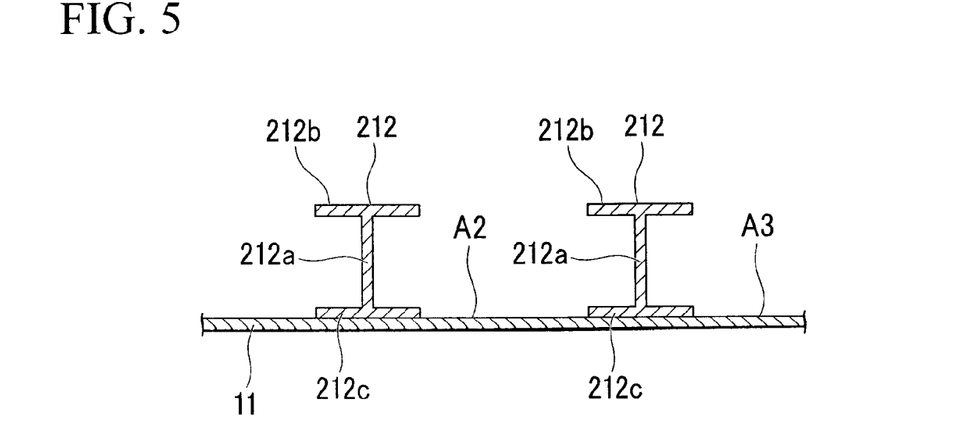
FIG. 5 is a cross-sectional view showing another modification of the first embodiment and taken along the line A-A in FIG. 2.

In addition, the ribs 12 shown in FIGS. 2 and 3 have L-shaped section; however, the sectional shape of the rib is optional. For example, ribs (i.e., beams) 112 shown in FIG. 4, which have a vertical wall 112a, an upper flange 112c extending horizontally from the top of the vertical wall 112a, and a bottom flange 112b extending horizontally opposite direction to the upper flange 112c from the bottom of the vertical wall 112a, can be employed. Further, as shown in FIG. 5, ribs (i.e., beams) 212, which have substantially I-shaped sections by a vertical wall 212a, an upper flange 212b extending horizontally from the top of the vertical wall 212a, and a bottom flange 212c extending horizontally from the bottom of the vertical wall 212a, can be employed.

In the above-mentioned structure, as shown in FIG. 1, when the other vehicle C' collides the side of the vehicle C having the above-mentioned vehicle seat 1, collision load F thereof is applied to the outside seat rail 7 of the width direction of the vehicle via the side door 2, the seat body 5, or the like. The load F is applied to the ribs 12 of the load absorption member, bends the ribs 12, and causes a shearing stress in the areas A1, A2, and A3 of the base plate to prevent deformation of the ribs 12. Specifically, for example, when the collision load F is applied as an arrow in FIG. 2 shows and the ribs 12 existing ahead of the load F are deformed, the shearing stress "a" rises in the areas A1 and A2 existing between the deformed rib 12 and the adjacent rib 12. Furthermore, shearing stress rises also in the area A3 owing to the deformation of the adjacent area A2. The collision load F is absorbed by the shearing stresses in the areas A1 and A2 and the deformations of the ribs 12.

With respect to the vehicle seat 1, the shearing stresses in the areas A1, A2, and A3 of the base plate 11 are kept when the ribs 12 are bent and deformed owing to the load applied exceeding the elastic limit of the ribs 12. Therefore, when there is a lateral collision, the vehicle seat 1 can absorb the collision energy in long stroke extend (that is, even if the collision energy is large or small).

Figure 6:
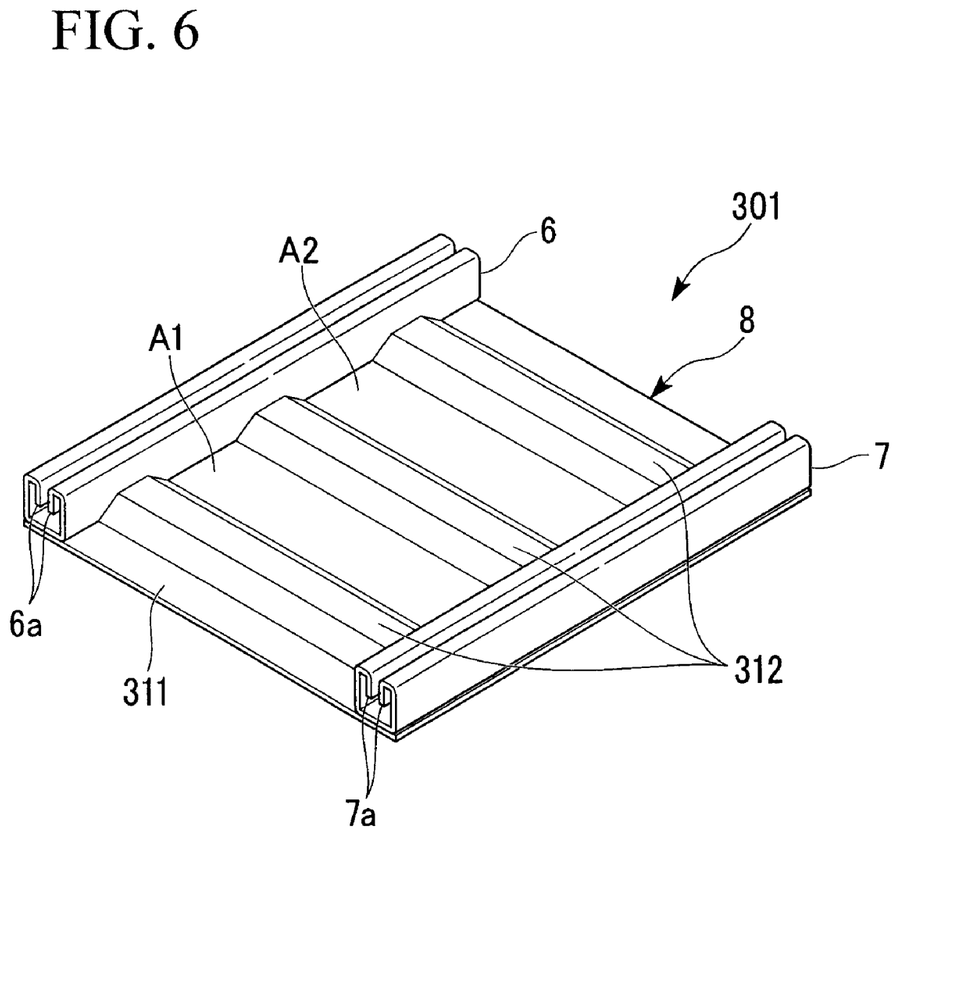
FIG. 6 is a perspective view showing a second embodiment of the present invention.

FIG. 6 shows a second embodiment of the present invention.

A vehicle seat 301 of the present embodiment has a base plate 311 (i.e., a plate-shaped portion) is joined to the lower face of the pair of seat rails 6 and 7 extending along the longitudinal direction of the vehicle similarly to the first embodiment. A plurality of ribs (i.e., beams) 312 having trapezoid sections are formed integrally to the base plate 311. The ribs 312 are formed by deforming the base plate so as to swell out upward from a base face (i.e., an upper face) of the base plate having the same height as the lower faces of the seat rails 6 and 7 so that both ends are in contact with the side faces of the seat rails 6 and 7. Therefore, the ribs 312 are formed as parts of a plate member forming the base plate 311 and partition the base plate 311 into the areas A1 and A2 along the longitudinal direction of the vehicle. The load absorption member 8 of the present invention is structured from the base plate 311 and the ribs 312.

With regard to the vehicle seat 301 of the present invention, the ribs 312 are formed integrally with the base plate, and in contact with the side face of the seat rails 6 and 7 similarly to the first embodiment. Therefore, the collision load which is applied by the lateral collision is mainly supported by the ribs 312. The shearing stresses preventing the deformation of the ribs 312 rise in the partitioned areas A1 and A2 of the base plate 311 when the ribs 312 are deformed by collapsing or bending. Thus, the collision energy can be reliably and stably absorbed by the vehicle seat 301 similar to the first embodiment.

Figure 7:
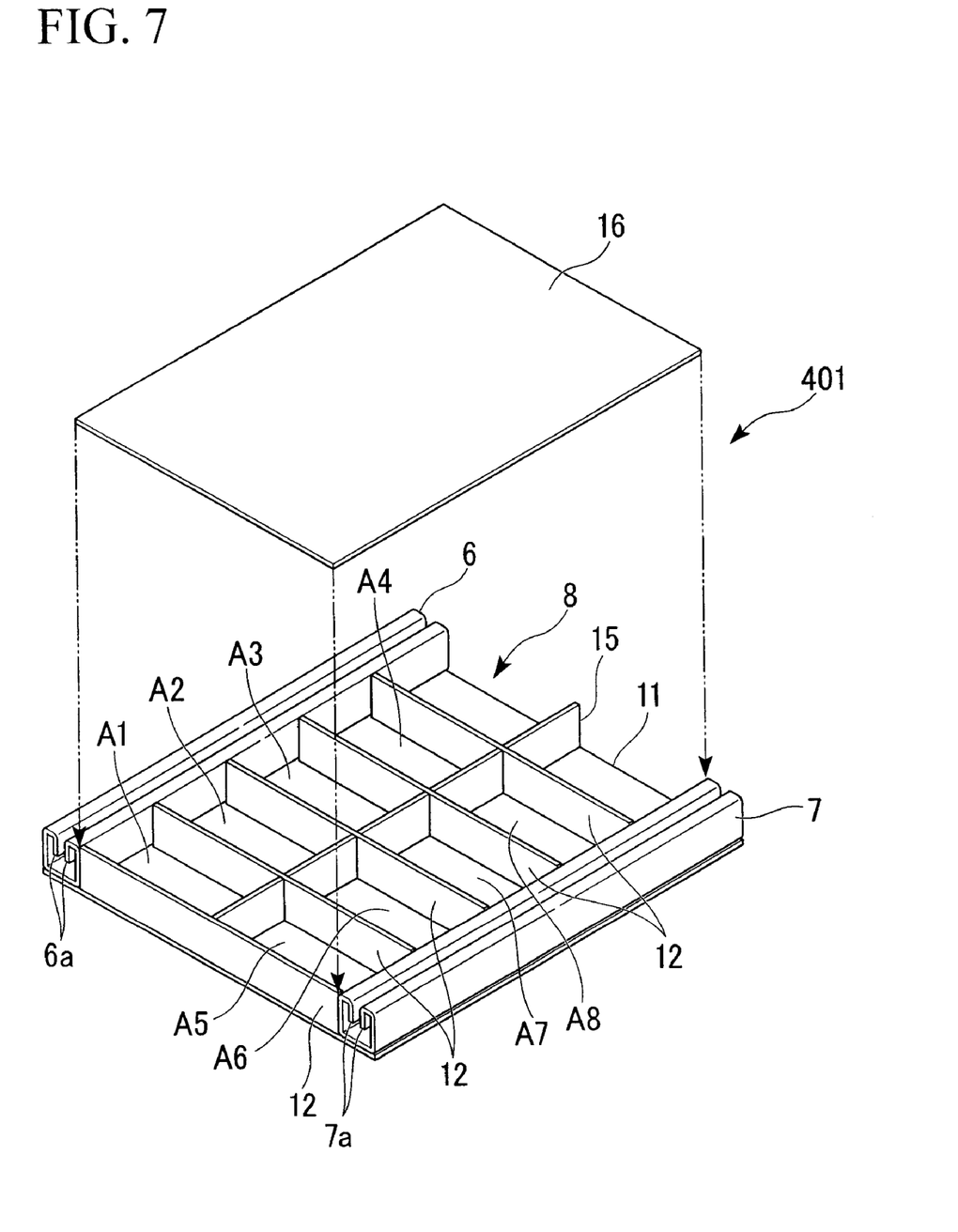
FIG. 7 is an exploded perspective view showing a third embodiment of the present invention.

FIG. 7 shows a third embodiment of the present invention.

A vehicle seat 401 of the present embodiment has a pair of seat rails 6 and 7 extending along the longitudinal direction of the vehicle, a base plate 11 joined to the lower face of the seat rails 6 and 7 as the first embodiment, and a plurality of ribs 12 extending along the width direction of the vehicle and joined to the upper face of the base plate 11. A middle reinforcement rib 15 extending along the longitudinal direction of the vehicle is joined to substantially a middle position along the width direction of the vehicle of the base plate 11. The middle reinforcement rib 15 crosses the ribs 12 extending along the width direction of the vehicle and is joined to the ribs 12. A plate-shaped upper plate (i.e., plate-shaped portion) 16 is disposed on the top of the ribs 12 and the middle reinforcement rib 15 between the seat rails 6 and 7. The upper plate 16 is joined on the top portion of the ribs 12 and the middle reinforcement rib 15.

The base plate 11 of the vehicle seat 401 is partitioned into the areas A1 to A8 by the ribs 12 and the middle reinforcement rib 15; further, the upper plate 16 is joined on the upper portions thereof and also partitioned into a plurality of areas. Therefore, the lateral collision causes shearing stress uniformly in the base plate 11 and the areas A1 to A8 of the upper plate 16; thus, the shearing stress preventing the deformation of the ribs 12 can function fully and efficiently. Furthermore, since the middle reinforcement rib 15 is provided, the load can be transmitted uniformly to between adjacent areas via the middle reinforcement rib 15; thus, the stress risen in the base plate 11 and the upper plate 16, so that the deformation of the ribs 12 can be efficiently prevented.

Figure 8:
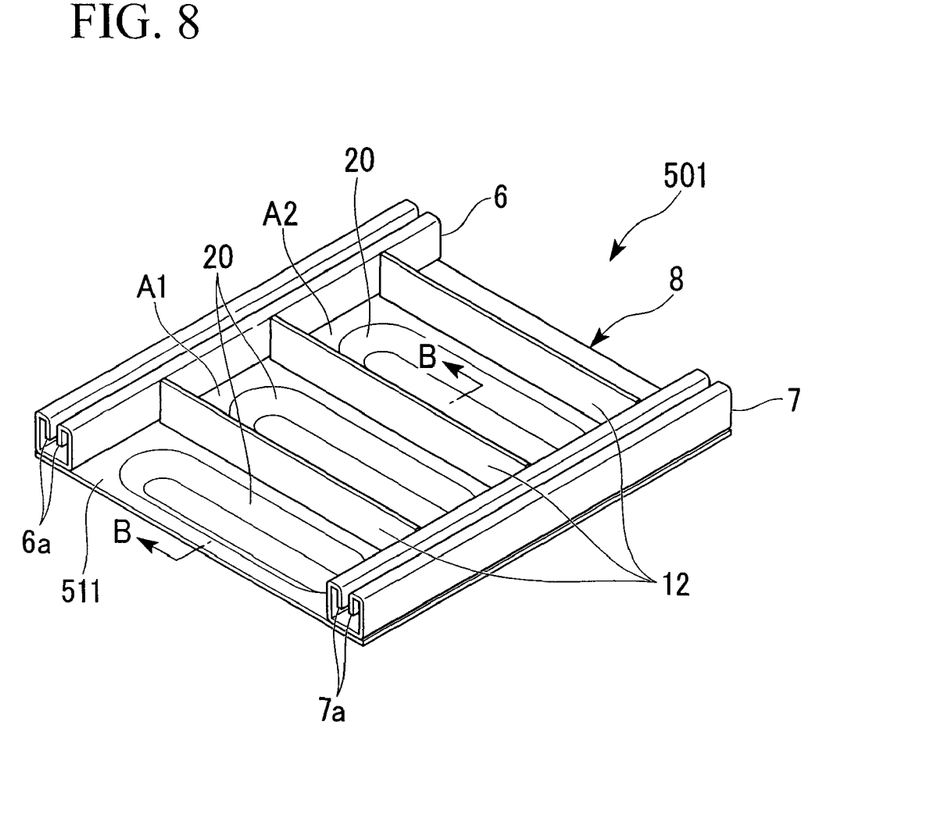
FIG. 8 is a perspective view showing a fourth embodiment of the present invention.
Figure 9:
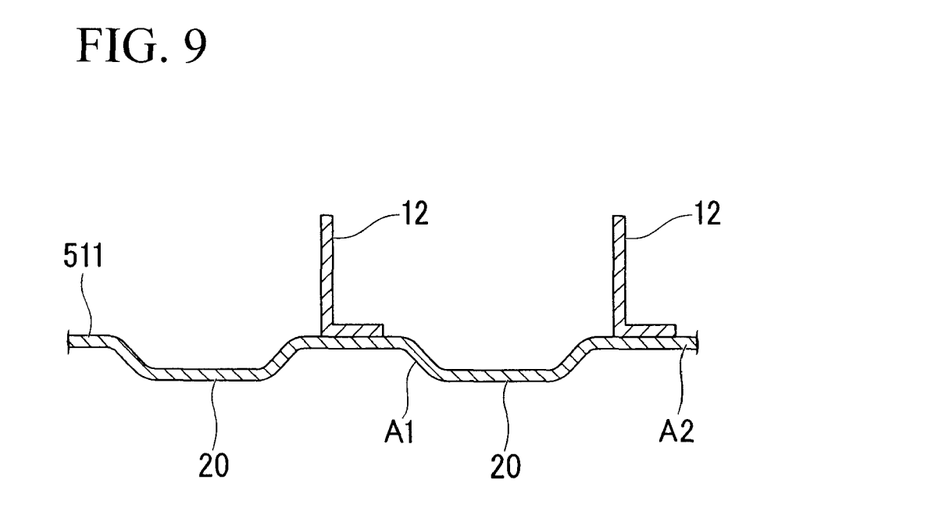
FIG. 9 is a cross-sectional view showing the fourth embodiment and taken along the line B-B in FIG. 8.

FIGS. 8 and 9 show a fourth embodiment of the present invention.

A vehicle seat 501 of the present embodiment has the pair of seat rails 6 and 7 extending along the longitudinal direction of the vehicle, and a base plate (i.e., plate-shaped portion) joined to the lower face of the seat rails 6 and 7, similar to the first embodiment. The plurality of ribs extending along the width direction of the vehicle are joined on the upper face of the base plate 511. Dissimilar to the first embodiment, an area where the ribs 12 are not joined to in the base plate 511 is provided with a dimple 20 having substantially an elliptical shape extending along the width direction of the vehicle and depressed downward of the vehicle.

The vehicle seat of the present embodiment can basically obtain the same function as the first embodiment; furthermore, the rigidity of the base plate 511 can be highly improved without adding another member since the dimples 20 are formed on the base plate 511. In addition, since side walls of the dimple 20 partition the base plate 511 into smaller areas, the shearing stress can rise in broad areas.

It should be understood that the above are exemplary of the present invention and not be considered as limiting. Modifications can be made without departing from the scope of the present invention. Accordingly, the present invention is not to be considered as being limited by the foregoing description, and is only limited by the scope of the appended claims.

What is claimed is:

1. A vehicle seat comprising:
    a seat body;
    a plurality of seat supports which include a pair of seat rails which extend along the longitudinal direction of a vehicle, are spaced at a fixed interval along the width direction of the vehicle corresponding to a width of the seat body to support the seat body; and
    a load absorption member which connects the adjacent seat supports to each other,
    wherein the load absorption member comprises:
        a plurality of beams which extend between the adjacent seat supports along the width direction of the vehicle; and
        a plate-shaped portion attached between a floor panel and the seat rails and located below the plurality of seat supports and on which the beams are provided along the width direction of the vehicle to form a plurality of areas which are partitioned with the beams so that the plurality of areas are arranged along the longitudinal direction of vehicle, the plate-shaped portion being provided only between the pair of seat rails,
    wherein the beams are fixed on an upper face of the plate-shaped portion, and
    wherein the seat supports are joined at bottom faces to both ends of the plate-shaped portion along the width direction of the vehicle.

2. The vehicle seat according to claim 1, wherein the beams transmit load which is applied therein to the areas of the plate-shaped portion.

3. The vehicle seat according to claim 1, wherein the seat supports include a pair of slide rails which support the seat body slidably forward and backward along the vehicle.

4. The vehicle seat according to claim 1, wherein the beams include:
    a bottom flange which is fixed on the upper face of the plate-shaped portion; and
    a vertical wall which stands from the bottom flange.

5. The vehicle seat according to claim 4, wherein the bottom flange and the vertical wall of the beams form substantially an L-shaped section.

6. The vehicle seat according to claim 4, wherein the beams include an upper flange which extends from a top of the vertical wall parallel to the bottom flange, and the bottom flange and the upper flange extend in opposite directions from each other from the vertical wall.

7. The vehicle seat according to claim 4, wherein the beams include an upper flange which extends from a top of the vertical wall parallel to the bottom flange, and the bottom flange, the upper flange, and the vertical wall therebetween form substantially an I-shaped section.

8. The vehicle seat according to claim 4, wherein the bottom flange is joined to the plate-shaped portion substantially throughout the width direction of the vehicle.

9. The vehicle seat according to claim 1, wherein the plate-shaped portion and the seat supports have substantially the same length along the longitudinal direction of the vehicle.

10. The vehicle seat according to claim 1, wherein the beams are formed as one with the plate-shaped portion by pushing upward a part of a flat plate member forming the plate-shaped portion.

11. The vehicle seat according to claim 1, further comprising a middle reinforcement rib which is disposed on substantially a middle position of the plate-shaped portion along the width direction of the vehicle and extends along the longitudinal direction of the vehicle.

12. The vehicle seat according to claim 11, wherein the middle reinforcement rib crosses the beams and is joined to the beams.

13. The vehicle seat according to claim 11, wherein the load absorption member further comprises a flat plate-shaped portion which is joined to upper portions of the beams and the middle reinforcement rib.

14. The vehicle seat according to claim 1, further comprising a flat plate-shaped portion which is joined to upper portions of the beams.

15. The vehicle seat according to claim 1, further comprising a dimple which is formed on the area of the plate-shaped portion partitioned with the beams so as to be depressed downward with regard to a vehicle body.

16. The vehicle seat according to claim 15, wherein the dimple has substantially an oval-shaped extending along the width direction of the vehicle.

17. The vehicle seat according to claim 1, wherein the seat body comprises a seat cushion frame, and the plurality of beams are spaced apart from the seat cushion frame.

18. The vehicle seat according to claim 1 further comprising a pair of sliders provided in a seat cushion slidably forward and backward along the vehicle so as to adjust a forward and backward position of the seat body along the vehicle.

* * * * *